E. F. SODERBORG.
REFRIGERATOR.
APPLICATION FILED JULY 2, 1913.
1,115,121. Patented Oct. 27, 1914.
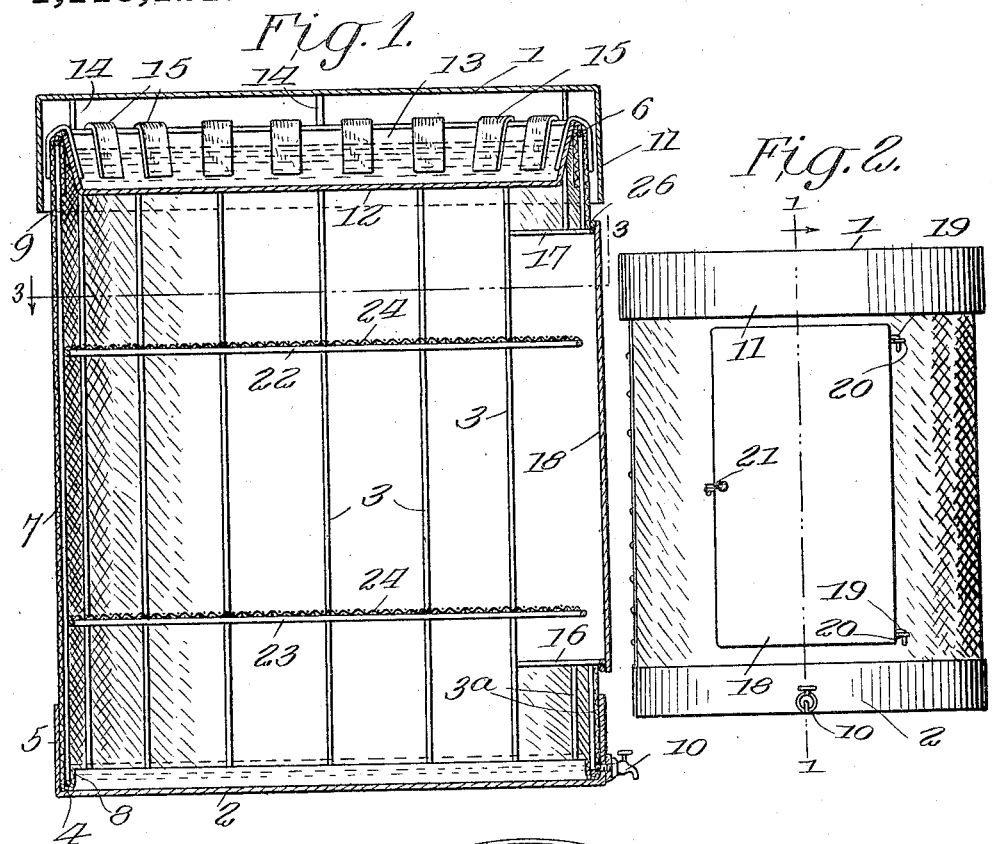
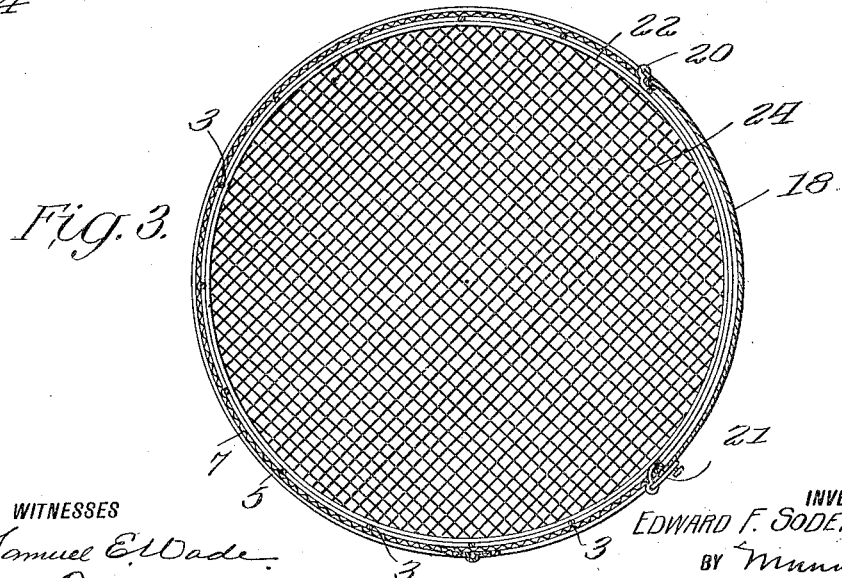
WITNESSES
Samuel E. Wade
C. E. Trainor
INVENTOR
EDWARD F. SODERBORG
BY Munn & Co.
ATTORNEYS

UNITED STATES PATENT OFFICE.

EDWARD FRANKLIN SODERBORG, OF SALT LAKE CITY, UTAH.

REFRIGERATOR.

1,115,121. Specification of Letters Patent. Patented Oct. 27, 1914.

Application filed July 2, 1913. Serial No. 777,011.

*To all whom it may concern:*

Be it known that I, EDWARD F. SODERBORG, a citizen of the United States, and a resident of Salt Lake City, in the county of Salt Lake and State of Utah, have invented a new and useful Improvement in Refrigerators, of which the following is a specification.

My invention is an improvement in refrigerators, and has for its object to provide a device of the character specified, wherein the refrigeration is carried out without the use of ice by means of absorbent material from which water is evaporated to provide the necessary refrigeration, and wherein means is provided for insuring a constant uniform flow of water to the absorbent material.

In the drawings:—Figure 1 is a section on the line 1—1 of Fig. 2, looking in the direction of the arrow, Fig. 2 is a reduced front view of the refrigerator, and Fig. 3 is a section on the line 3—3 of Fig. 1, looking in the direction of the arrow.

The present embodiment of the invention comprises a receptacle composed of caps 1 and 2, the said caps being oppositely arranged, and the caps are connected and held in spaced relation by means of rods 3, the said rods being spaced apart from each other. The lower ends of the rods are connected by a ring or annular frame 4, which fits within the flange 5 of the lower cap, resting upon the bottom thereof. The upper ends of the rods 3 are also connected by a ring or annular frame 6, and a porous covering 7 extends between the rings, the said covering being arranged in cylindrical form and having its ends turned inwardly over the rings or frames 4 and 6, as shown at 8 and 9 respectively. The cap 1 is of greater diameter than the cap 2, and a discharge valve 10 is connected with the cap 2 for discharging the excess water. The cap 1 is of such diameter that the flange 11 thereof will fit loosely around the upper end of the covering 7, where the said covering is turned over the frame 6.

A tank comprising a bottom 12 and an annular marginal flange 13 is seated on the frame 6, and the said tank is provided with upwardly extending arms 14 for spacing the cap 1 above the tank. The tank is designed to hold water as shown, and a series of strips 15 of absorbent material, capable of conducting water, is arranged over the upper edge of the tank. The strips are so arranged that approximately one-half the length thereof is within the tank. The strips are so proportioned with respect to the tank that they extend to near the bottom thereof and below the water level in the tank. The strips are spaced apart from each other a distance corresponding approximately to the width of one of the strips, and the flange 11 of the cap fits closely around the portions of the strips on the outside of the tank, and the lower ends of the said portions of the strips overlap the covering 7 where the said covering is folded over the frame 6.

Sundry of the rods 3 are cut away intermediate their ends at the front of the refrigerator, the said rods being indicated at 3ª. The rods are connected at the lower end of the refrigerator by a transverse rod 16, and at the upper end of the refrigerator by a transverse rod 17, the ends of the said rods 16 and 17 being connected to the rods 3 at each side. The covering 7 is also cut away between the rods 16 and 17, and a door 18 is provided for covering the space where the said covering is cut away, the door being curved transversely to fit the receptacle. The door is provided at one side edge with hooks 19 which engage eyes 20 on the rods 3, and at the other side edge with a latch 21 for holding the door closed.

Annular frames 22 and 23 are arranged within the receptacle and inside the rods 3, the said frames being connected to the said rods 3, and a partition 24 of perforate material is connected with each frame, the said partitions being adapted to receive and hold the material to be cooled.

In operation, the tank 12 being provided with water and the strips 15 being arranged as described, the water is absorbed by the strips and through capillary attraction is passed down outside the tank and on to the covering 7. The air may pass freely through the said covering which is of porous material and the water is evaporated by the air, thus cooling the interior of the receptacle. Any excess water will pass downwardly into the lower cap 2, and may be drawn off through the valve 10. The air may circulate freely through the entire extent of the refrigerator, the partitions 24 offering no resistance to the said passage. The door 18 fits above and below the rods 16 and 17, and each end of the door is provided on its inner face with a rib 26 for engaging outside the said rods. The said rods 16 and 17 extend beyond the rods 3 and 3ª, so that the door is spaced out beyond the covering 7. The cap or cover 1 may be removed to permit the replenishment of the water in the tank, and the arms 14 prevent the cap pressing upon the strips 15.

The top of the marginal flange 13 is seated on the frame 6, to permit the strips 15 to lap over the covering 7, and the lower end of the outside portions of the strips touch the covering 7, to form a connection therewith for the passage of the water.

I claim:—

A refrigerator comprising a body composed of vertically spaced open annular frames, rods connecting the frames and spaced apart from each other, a covering of fabric material fitting outside of the body and having its ends turned inwardly over the frames, a lower cap in which the lower end of the body is seated, a tank for containing water fitting within the upper frame and supported thereby, an upper cap fitting over and inclosing the tank, a series of strips of absorbent material arranged on the edge of the tank and extending to near the bottom of the tank on the inside thereof and to the covering of the frame at the outside thereof, the upper frame having upwardly extending arms engaging the upper cap and supporting the same in spaced relation above the upper edge of the tank.

EDWARD FRANKLIN SODERBORG.

Witnesses:
T. T. BURTON,
IDA B. SODERBORG.

---

Copies of this patent may be obtained for five cents each, by addressing the "Commissioner of Patents, Washington, D. C."